Sept. 13, 1966 A. CUTAIA 3,272,969

DIGITAL PULSE GENERATOR WITH COMPENSATION FOR DOCUMENT VELOCITY VARIATIONS

Filed Dec. 6, 1963 3 Sheets-Sheet 1

INVENTOR
ALFRED CUTAIA

BY Donald F. Voss
ATTORNEY

Sept. 13, 1966 A. CUTAIA 3,272,969

DIGITAL PULSE GENERATOR WITH COMPENSATION FOR DOCUMENT VELOCITY VARIATIONS

Filed Dec. 6, 1963 3 Sheets-Sheet 2

Sept. 13, 1966 A. CUTAIA 3,272,969

DIGITAL PULSE GENERATOR WITH COMPENSATION FOR DOCUMENT VELOCITY VARIATIONS

Filed Dec. 6, 1963 3 Sheets-Sheet 3

United States Patent Office 3,272,969
Patented Sept. 13, 1966

3,272,969

DIGITAL PULSE GENERATOR WITH COMPENSATION FOR DOCUMENT VELOCITY VARIATIONS

Alfred Cutaia, Rochester, Minn., assignor to International Business Machines Corporation, New York, N.Y., a corporation of New York Filed Dec. 6, 1963, Ser. No. 328,678
10 Claims. (Cl. 235—61.11)

Figure 1:
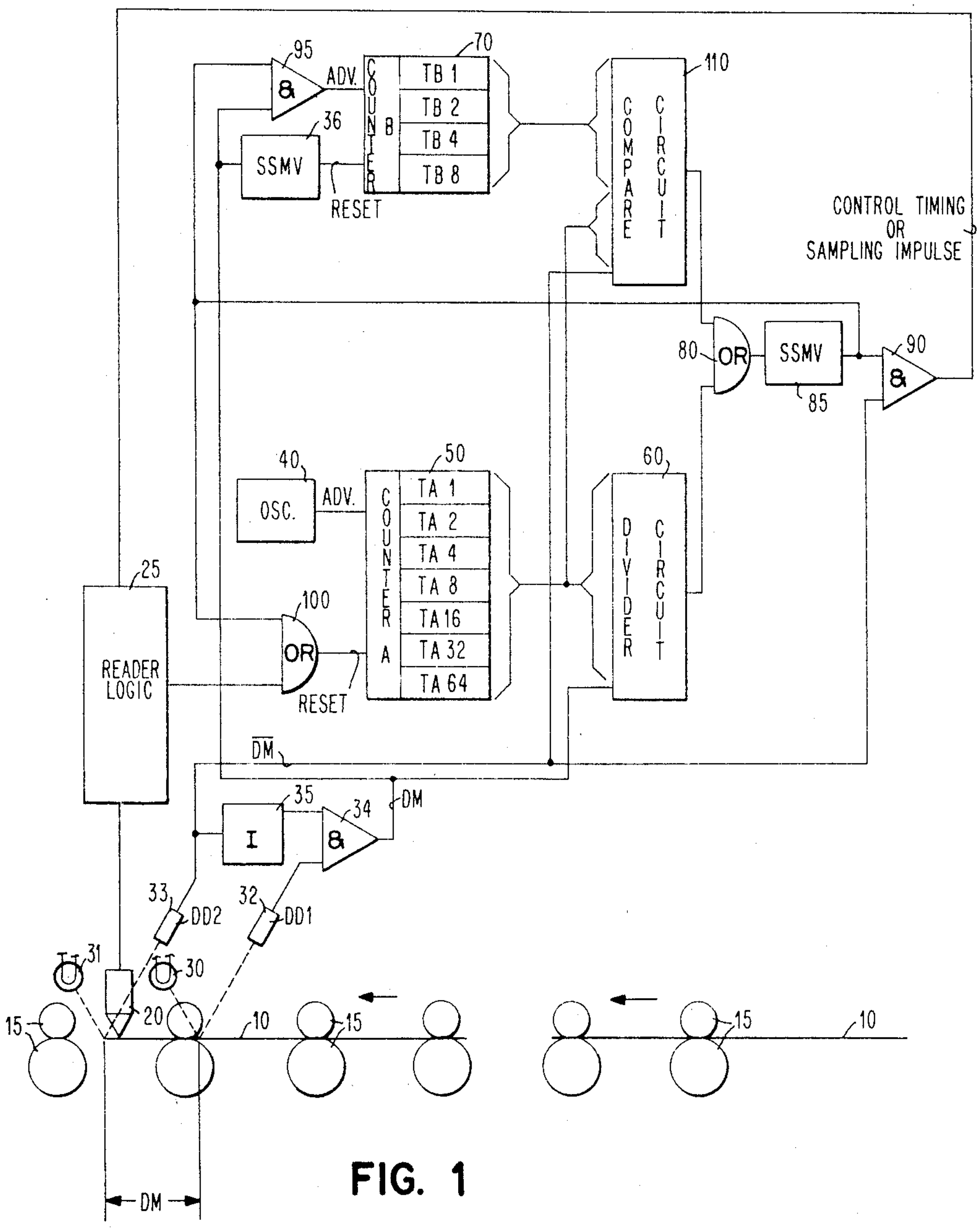

This invention relates to digital pulse generators and more particularly to variable frequency digital pulse generators and still more particularly to digital pulse generators having compensation for document velocity variations.

This invention is particularly suitable to be incorporated into machines for reading human intelligible characters on documents. These machines generally incorporate an oscillator or timing pulse generator which generates sampling impulses for dividing a character into a predetermined number of sampling time intervals. Hence there is a need for generating these timing pulses in direct relationship to the actual document velocity. Timing or sampling pulses have been produced with this invention which are referenced within ±1% of actual document velocity in a document reading machine where the average velocity of the documents varies ±5%. The largest contributing factor to variation in document velocity is the different thicknesses of the documents being read.

In this invention, the average velocity of the documents to be read is measured over a defined transport interval just prior to the reading of the documents. A pair of document sensors are spaced from each other according to the defined transport interval. This interval has a minimum value, as it will be seen later herein, which can be increased dependent upon the desired accuracy of the system.

When the first document sensor or detector detects the leading edge of a document approaching the reading station, it develops a signal for gating a frequency divider network which is connected to the output of a counter continuously advanced by an oscillator. The output of the frequency divider network is gated into a second counter so as to advance the same during the time period that the leading edge of the document is advancing from the first to the second document detector. When the leading edge of the document passes under the second sensor or document detector, the counter connected to the output of the frequency divider network is no longer advanced. However, its fixed count or value is compared against the value in the counter being advanced by the oscillator by means of a compare network. Hence, by this arrangement there will be an output from the compare network when the value of the two counters are equal. This output signal is the control timing impulse or sampling impulse. This impulse is also used to reset the counter advanced by the oscillator. The comparison operation and the generation of the control timing impulse continues so long as the document is detected by the second document sensor or detector. The document will be detected by the second document sensor for the entire period that the document is being read.

It is thus seen that the frequency of the pulse generator is directly related to the document velocity because the document velocity is measured prior to the reading operation and the frequency of the pulse generator is effectively set or adjusted by the document velocity of each document which is to be read. The frequency of the oscillator for advancing the counter is determined by dividing the maximum document velocity by the length of the cyclic sampling interval and the minimum accuracy required for referencing the occurrence of the sampling pulses to the actual document velocity.

Accordingly, a principle object of this invention is to provide a variable frequency digital pulse generator.

Another object of this invention is to provide a digital pulse generator having compensation for variations in document velocity.

Still another very important object of the invention is to provide a digital pulse generator for generating impulses in a timed relationship with respect to the movement of a document which can change the frequency of the impulses generated in accordance with changes in velocity of the documents.

Another more specific very important object of the invention is to provide a digital pulse generator having compensation for document velocity variations which generates a number of impulses during a sensed reference interval, stores this number of impulses and thereafter utilizes the stored number of impulses as a reference whereby a controlled generated impulse is developed when the number of impulses generated equals the reference value.

Yet another object of the invention is to provide a digital pulse generator for generating timing pulses at a frequency varying in accordance with the variations of document velocity which is able to maintain the variations in pulse frequency closely related to the variations in document velocity.

Another object of the invention is to provide a digital pulse generator for generating impulses varying in frequency according to changes in document velocity which can increase the resolution or accuracy of the relationship between frequency and velocity variations by increasing the time interval or period during which document velocity is measured.

The foregoing and other objects, features and advantages of the invention will be apparent from the following more particular description of a preferred embodiment of the invention, as illustrated in the accompanying drawings.

Figure 2:
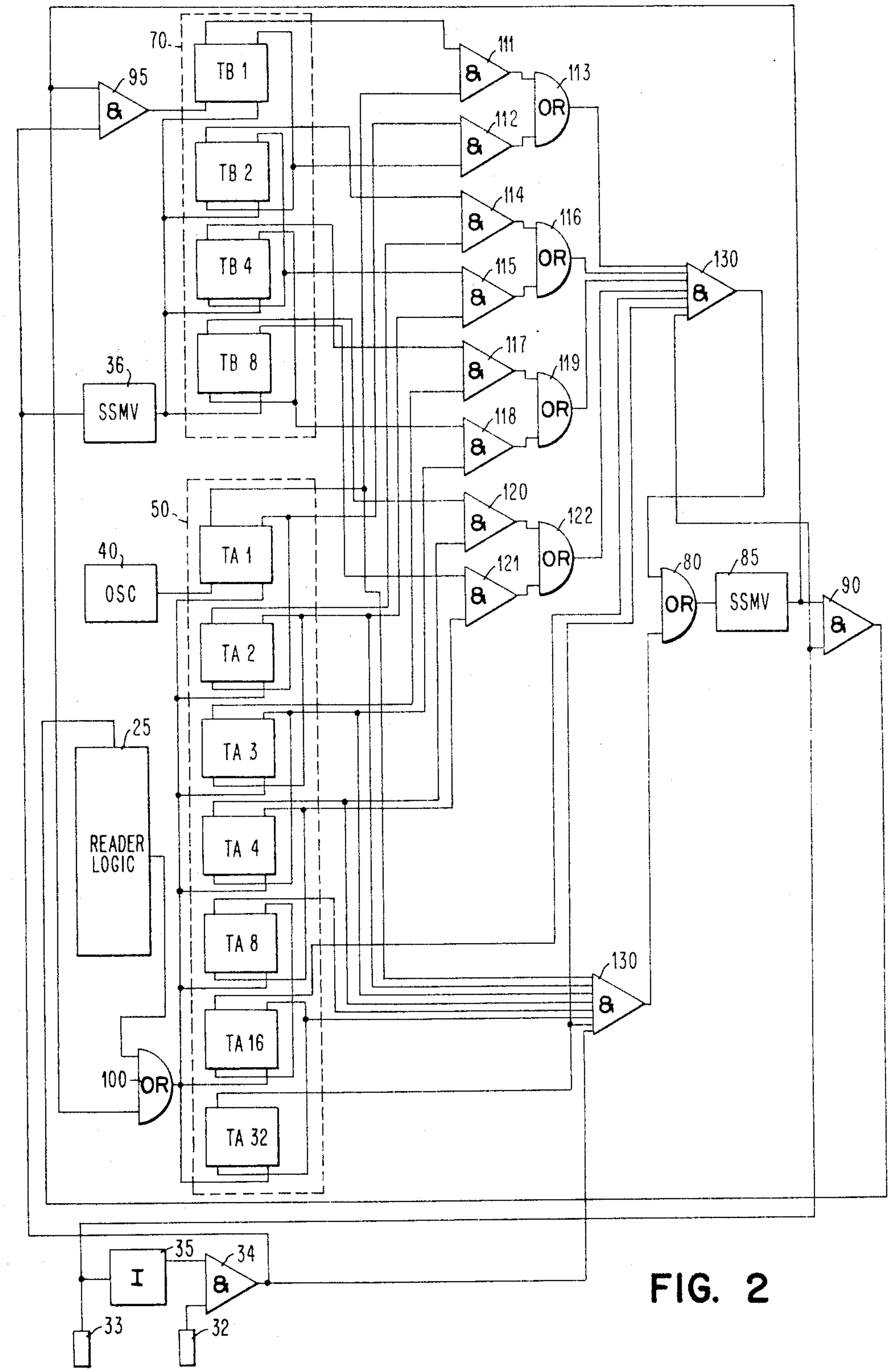

In the drawings:

FIG. 1 is a schematic block diagram of the digital pulse generator with compensation for document velocity variations and includes a portion of the document path;

FIG. 2 is a schematic circuit diagram of the digital pulse generator with compensation for document velocity variations; and FIGS. 3*a*, 3*b*, 3*c* and 3*d* are schematic diagrams respectively showing two stylized numeric characters and the output wave forms generated when each of the characters is scanned by a single gap magnetic read head for three different document velocities with the sampling pulses shown for the purpose of illustrating that the frequency of the digital pulse generator varies with document velocity so as to maintain a uniform sampling interval.

Figure 3A:
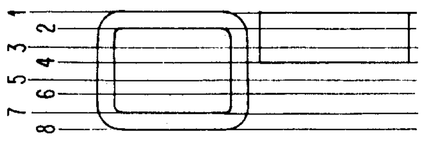

With reference to the drawings and particularly to FIGS. 1 and 3*a*, the invention is illustrated by way of example as being incorporated into a document reader for reading characters printed as stylized human readable characters. Documents 10 are fed in seriatim from a hopper, not shown, and are conveyed by a series of longitudinally spaced cooperating feed rollers 15 relative to a magnetic read head 20 which functions to read the stylized characters contained on the documents 10. After the documents are read by magnetic read head 20, they are conveyed by feed rollers 15 to a stacker, not shown.

The document reader schematically illustrated in FIG. 1 is of the type shown and described in U.S. patent application Serial No. 767,473, filed October 15, 1958, now Patent 3,114,131, dated December 10, 1963, for Single Track Character Sensing, by R. J. Furr et al., and assigned to the assignee of the present application. The sampling pulse generator in the referenced application was not compensated for document velocity variations. Hence, the instant invention could be incorporated into apparatus embodying the invention of the referenced application and would improve the performance thereof because the sampling intervals would be more closely controlled. The block 25 in FIG. 1 entitled "Reader Logic" incorporates the circuitry illustrated in FIGS. 2*a*, 2*b* and FIG. 3 of the referenced application. Essentially, the digital pulse generator of this invention would replace the single-shot multi-vibrator 44 shown in FIG. 2*a* of the referenced application.

In the example for illustrating the present invention, the velocity of each document 10 in FIG. 1 is measured just prior to the first character on document 10 being read by magnetic read head 20. Document detectors DD1 and DD2 are longitudinally spaced from each other and function to generate a signal upon detection of a document 10. Document detectors DD1 and DD2 consist of light sources 30 and 31 and light sensitive elements 32 and 33 respectively. Light source 31 and light sensitive element 33 are positioned so that the leading edge of document 10 is detected just prior to the first character on the document being in position for reading by magnetic head 20. In this example, the leading edge of the document will be detected when it is approximately 0.200 inch past the gap of the magnetic read head 20. Light source 30 and light sensitive element 32 forming document detector DD1 are positioned so as to detect the leading edge of the document 10 when the same is approximately 1.24 inches away from the position where the leading edge will be detected by document detector DD2.

The velocity of each document will be measured as the leading edge of the document is travelling from the position where it is detected by document detector DD1 to the position where it will be detected by document detector DD2. Thereafter, the characters on the document 10 will be read by the magnetic read head 20 and during the reading of the characters, the digital pulse generator will generate sampling pulses which are closely related to the measured document velocity so as to divide the character interval into a predetermined number of sampling intervals irrespective of the document velocity. The distance between document detectors DD1 and DD2 must be great enough to insure that system variances such as threshold level of the document detectors which are affected by temperature, circuit drift and the condition of the leading edge of the documents can be ignored. Hence, if greater resolution is required, the distance between document detectors DD1 and DD2 can be increased. However, it should be noted that the distance between documents must be slightly greater than the distance between the document detectors DD1 and DD2.

Th distance between document detectors DD1 and DD2 has been identified as DM. This distance can be computed by the following formula:

$$DM \geq \Delta\frac{DM}{XM}$$

where $\Delta$DM is the maximum variation expected in the electrical and mechanical measurement of DM, and XM is the minimum required accuracy of the system. In this particular example, $\Delta$DM was assumed to be $10\times10^{-3}$ inches. The minimum accuracy of this system is taken as $\pm1\%$, or $1\times10^{-2}$.

Hence, $$DM \geq \frac{\Delta DM}{XM} \geq \frac{10\times10^{-3}}{1\times10^{-2}} > 1.0 \text{ inch}$$

Hence, the minimum distance is 1.0 inch, however, the actual spacing chosen is 1.24 inches.

The average velocity of each document is measured during the time the leading edge of each document passes through the distance DM. This period of time is defined by the number of impulses generated by an oscillator 40 during this time. The number of impulses generated by oscillator 40 during the time the leading edge of the document travels the distance DM is used as a reference to control the frequency of the digital oscillator which generates the control timing for the reader logic 25.

The frequency of the oscillator 40 is determined by the maximum document velocity divided by the desired document displacement interval required for recognition logic timing of the reader logic 25 and the minimum accuracy of the system. Therefore, $$f = \frac{V\text{max}}{Dd(Xm)}$$

where Vmax is maximum document velocity, D*d* is the desired document displacement interval and X*m* is the minimum accuracy of the system. In this example, maximum velocity equals 140 inches per second and the desired document displacement interval equals .014 inch. Hence, the frequency of the oscillator 40 equals $$f = \frac{140}{.014}\times.01 = 1.0\times10^{6} \text{ cps.}$$

The pulses generated by oscillator 40 during the period that the leading edge of the document is travelling the distance DM are counted by a binary counter 50 in combination with a divider circuit 60 and a binary counter 70. The counter 50 is connected to oscillator 40 so as to be advanced thereby. The size of the counter 50 is directly related to the maximum and minimum document velocities. In this example, the minimum document velocity is 126 inches per second. The maximum document velocity as previously indicated is 140 inches per second. Hence, the maximum number of impulses to be counted will be equal to $$\frac{Dd}{V\text{min}}f = \frac{.014}{126}\times10^{6} = 111$$

The minimum count which counter 50 is required to make is determined by the desired document displacement interval divided by the maximum velocity times the frequency and in this example it equals $$\frac{.014}{140}\times10^{6} = 96$$

Hence, the counter 50 will contain a value between 96 and 111 if the average document velocity varies within the limits of 126 inches per second to 140 inches per second. Since counter 50 is a binary counter, it requires only seven stages which enable it to count up to 128, which of course exceeds the maximum count of 111. It is thus seen that counter 50 will have a count between 96 and 111 as the leading edge of the document moves a distance equal to D*d*, or, in this example, .014 inch. Since, in this example, the transport interval for which the average velocity of the document is determined is defined as D*m* which is equal to 1.24 inches, counter 50 will be cycled by a factor K equal to $$\frac{Dm}{Dd} = \frac{1.24}{.014} = 89 = K$$

Of course, counter 50 could have been made large enough to count all of the pulses generated by oscillator 40 as the leading edge of a document moves through the distance D*m*. However, to reduce the amount of apparatus required, divider circuit 60 is connected to the outputs of the elements forming counter 50 so as to provide an output whenever counter 50 reaches the value of 89 or the factor K. The oscillator 40 is a free running oscillator and it will advance counter 50 continuously.

The divider circuit 60 can only pass a signal when counter 50 reaches a count of 89 during the time that the leading edge of the document is passing through the distance DM. This is because the output of the light sensitive element 32 of document detector DD1 is connected to an input of a logical AND circuit 34 which has its output connected to divider circuit 60. Logical AND circuit 34 also has an input connected to the output of an inverter 35. The input of inverter 35 is connected to the output of light sensitive element 33 of document detector DD2. Hence, by this arrangement, logical AND circuit 34 will be conditioned to pass a signal during the period that light sensitive element 32 of document detector DD1 detects the document 10 and light sensitive element 33 of document detector DD2 does not sense the document 10.

The output of the divider circuit 60 is connected to the input of a logical OR circuit 80 which has its output connected to the input of a singleshot multi-vibrator 85. The output of the singleshot multi-vibrator 85 is connected to the input of a logical AND circuit 90 and to the input of the logical AND circuit 95. Logical AND circuit 90 also has an input connected to the output of the light sensitive element 33 of document detector DD2. Therefore, logical AND circuit 90 will be conditioned only during the time that the document is being sensed by the light sensitive element 33, which of course, is during the time that the characters on the document 10 are being read and not during the time that the average velocity of the document is being measured. Logical AND circuit 95 also has an input connected to the output of logical AND circuit 34. It is thus seen that logical AND circuit 95 will be conditioned to pass an impulse during the time that the document 10 is being sensed by the light sensitive element 32 of document detector DD1. This is the period during which the average velocity of the document 10 is being measured. Consequently, an impulse will be passed by logical AND circuit 95 to advance counter 70 during the time that the document is being sensed only by the light sensitive element 32 and when counter 50 has reached a count of 89 as determined by the divider circuit 60, whereby a pulse is passed via logical OR circuit 80 to the singleshot multi-vibrator 85 which develops a discrete pulse to advance counter 70.

Each time counter 70 is advanced, counter 50 is reset because the impulse for advancing counter 70 is passed via logical OR circuit 100 to the reset terminal of counter 50. Logical OR circuit 100 also has an input connected to the output of reader logic 25 so that counter 50 can be reset initially upon the peak detector of reader logic 25 detecting that a character has been detected by the magnetic read head 20. This resetting of counter 50 takes place during the reading of characters and not during the measurement of the average velocity of the document to be read.

When the leading edge of a document 10 is detected by light sensitive element 33, divider circuit 60 and logical AND circuit 95 are no longer conditioned to pass an impulse because the input conditions to logical AND circuit 34 will not be satisfied and therefore, logical AND circuit 34 will not have an output at a level for conditioning divider circuit 60 and logical AND circuit 95.

A value in counter 70 is indicative of the average velocity of the document to be read. Hence, this value will be maintained in counter 70 during the entire period that the document is being read. As the document is being read, counter 50 will continue to be advanced by oscillator 40; however, during the period of time that the document is being read, the contents of counter 50 will be compared with the contents of counter 70 by means of comparison circuitry 110.

The compare circuitry 110 is connected to the outputs of counter 70 and to the corresponding low order outputs of counter 50 and the higher order outputs of counter 50 which are indicative that the counter 50 has reached a count of at least 96. The compare circuitry is operable only during the time that the characters on document 10 are being read because it has an input connected to the output of light sensitive element 33 of document detector DD2. The output of compare circuitry 110 is connected to an input of logical OR circuit 80. By this arrangement, when the compare circuitry 110 detects a comparison between counters 50 and 70, an impulse is generated and this impulse at this time will be passed by logical AND circuit 90 which is conditioned by the output of light sensitive element 33. The impulse passed by logical AND circuit 90 will be transmitted to reader logic 25 as a sampling impulse. This impulse will also be used to reset counter 50 via logical OR circuit 100. It is thus seen that counter 50 first functioned as a frequency divider during the period that the average velocity of the document was being measured and thereafter functions as a pulse generator for developing the sampling pulse.

The counter 70 is reset after the document 10 has been read. The resetting can be accomplished by the fall of the signal from document detector DD2 or upon document detector DD1 sensing the leading edge of the new document coming into the read station. In this example as shown in FIGS. 1 and 2, the output of logical AND circuit 34 is also connected to the input of a singleshot multi-vibrator 36 which has its output connected to the reset terminal of counter 70. Hence, counter 70 is reset upon light sensitive element 32 of document detector DD1 detecting the leading edge of document 10.

In FIG. 2, counter 50 is shown as being made up of triggers TA1, TA2, TA4, TA8, TA16, TA32 and TA64. The triggers making up counter 50 are interconnected so as to count in a binary manner up to 128. The reset terminals of triggers TA1, TA2, TA4, TA8, TA16, TA32, TA64 are connected to the output of logical OR circuit 100. Divider circuit 60 is essentially a logical AND circuit which is conditioned by logical AND circuit 34 and logical AND circuit 34 will be conditioned when light sensitive element 32 of document detector DD1 detects a document and light sensitive element 33 of document detector DD2 has not detected a document. Hence, logical AND circuit 34 will be conditioned for the entire period of time that the leading edge of the document is passing from under light sensitive element 32 until it is detected by light sensitive element 33. Therefore, logical AND circuit 60 will be conditioned for the period of time that the average velocity of the document is to be measured.

Logical AND circuit 60 functions to determine when counter 50 has reached the value of 89 and accordingly, the inputs of logical AND circuit 60 are connected to the set output of trigger TA1, the reset output of trigger TA2, the reset output of trigger TA4, the set output of trigger TA8, the set output of trigger TA16, the reset output of trigger TA32, and the set output of trigger TA64. It is seen that the true and complement sides of the triggers forming counter 50 are examined by logical AND circuit 60. The output of logical AND circuit 60 is connected to an input of logical OR circuit 80 which in turn has its output connected to the input of singleshot multi-vibrator 85.

Counter 70 shown in FIG. 2 consists of triggers TB1, TB2, TB4, TB8. During the measurement of the average velocity of a document, counter 70 is advanced by counter 50 via logical AND circuit 60, logical OR circuit 80, singleshot multivibrator 85 and logical AND circuit 95. Hence, the output of logical AND circuit 95 is connected to the set terminal of trigger TB1 and the remaining triggers have their set terminals so interconnected as to count in a binary manner. The reset terminals of triggers TB1, TB2, TB4 and TB8 are connected to the output of singleshot multi-vibrator 36.

Logical AND circuits 111 and 112 function to compare the two states of trigger TA1 with the two states of trigger TB1 respectively. The outputs of logical AND circuits 111 and 112 are connected to inputs of the logical OR circuit 113 which has its output connected to the input of a logical AND circuit 130. Similarly, logical AND circuit 114 has an input connected to the set output of trigger TA2 and an input connected to the set output of trigger TB2 so as to compare the set states of these two triggers. Logical AND circuit 115 functions to compare the reset states of triggers TA2 and TB2. The outputs of logical AND circuits 114 and 115 are connected as inputs to a logical OR circuit 116. The output of logical OR circuit 116 is connected to an input of logical AND circuit 130. Logical AND circuits 117 and 118 function to compare the set and reset outputs of triggers TA4 and TB4, respectively. The outputs of logical AND circuits 117 and 118 are connected to the inputs of a logical OR circuit 119 which has its output connected to an input of logical AND circuit 130. Logical AND circuit 120 and 121 function to compare the set and reset outputs of triggers TA8 and TB8 respectively. The outputs of logical AND circuits 120 and 121 are connected to inputs of logical OR circuit 122 which has its output connected to an input of logical AND circuit 130.

Hence, it is seen that the low order triggers of counter 50 are compared with the triggers forming counter 70 and if there is a comparison between the two, a signal will be passed by logical AND circuit 130 provided counter 50 has reached a count greater than 96 and a document is being sensed by light sensitive element 33 because logical AND circuit 130 has inputs connected to the set outputs of triggers TA32 and TA64 and has an input connected to the output of light sensitive element 33.

The ouput of logical AND circuit 130 is connected to an input of logical OR circuit 80. Since logical AND circuit 90 will be conditioned at this time and logical AND circuit 95 will not be conditioned, the signal passed by logical OR circuit 80 will activate singleshot multivibrator 85 and an impulse will be passed by ligical AND circuit 90 as a sampling pulse to reader logic 25. It is thus seen that during the period of time that characters are being read from the documents 10, the counter 50 functions as a pulse generator and a pulse will be emitted whenever the triggers of counter 50 corresponding to those of counter 70 compare therewith and the triggers TA32 and TA64 of counter 50 have been set.

Figure 3D:
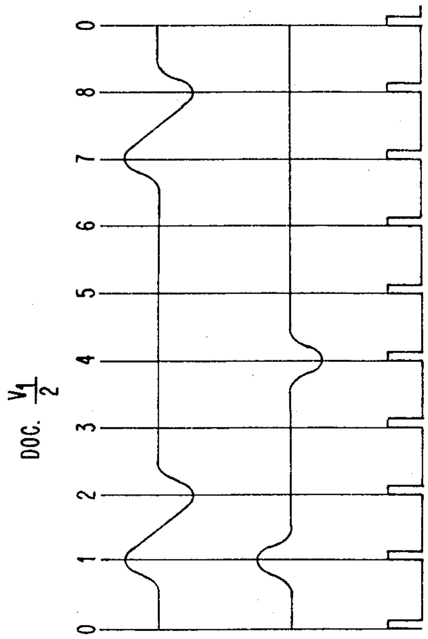
Figure 3C:
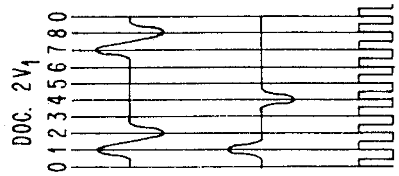
Figure 3B:
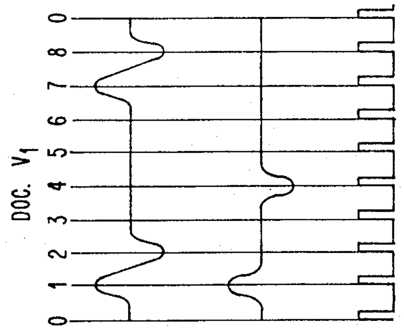

In FIG. 3*a*, there is illustrated two stylized numeric characters, 0 and 1. Each character is divided into seven intervals. The wave forms identifying the characters 0 and 1 are shown in FIGS. 3*b*, 3*c* and 3*d*, and they are shown as they appear when the characters are on a document travelling at a velocity V1, at a velocity of 2V1 and at a velocity of V1/2 respectively. The time duration of the sampling intervals with regard to the wave form varies depending upon the velocity of the document. Hence, it is seen that the frequency of the sampling pulses developed by the digital pulse generator varies in order to compensate for variations in the velocity of the documents.

From the foregoing, it is seen that the digital pulse generator of this invention compensates for document velocity variations. This is accomplished by measuring the average velocity of a document and thereafter adjusting the frequency of the digital pulse generator in accordance with the particular velocity measured. Further, it is seen that this is accomplished by first utilizing a counter as a frequency divider for the purpose of measuring the average velocity of the document and thereafter utilizing the counter as the timing pulse generator.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A variable frequency digital pulse generator comprising:

an oscillator, a first counter connected to said oscillator to be advanced thereby, a selectively operable frequency divider circuit connected to asid first counter to provide an output signal every time said first counter reaches a predetermined value, the output of said frequency divider circuit being connected to said first counter to reset the same with said output signal, means for selectively rendering said frequency divider circuit operable, a second counter connected to said frequency divider circuit to be advanced by the output signal therefrom, a selectively operable comparing means connected to said first and second counters to generate an output signal upon the values in said counters being equal, the output of said comparing means being connected to said first counter to reset the same with said output signal, and means for selectively rendering said comparing means operable.

2. The variable frequency digital pulse generator of claim 1 wherein said means for selectively rendering said frequency divider circuit operable is operable for a first predetermined period of time and said means for selectively rendering said comparing means operable is operable for a second predetermined period of time.

3. In a document reading machine, the combination comprising:

a first document detector positioned at a predetermined distance downstream of the read station in the document path of said document reading machine and operable to generate a signal upon detecting the presence of a document, a second document detector positioned at a predetermined distance upstream of the read station and operable to generate a signal upon detecting the presence of a document, logic circuit means connected to said first and second document detectors and operable to generate an output signal only when said first document detector alone is detecting the presence of a document, an oscillator, a first counter connected to said oscillator to be advanced thereby, a frequency divider circuit connected to said logic circuit means to be rendered operable thereby, and connected to said first counter to provide an output signal every time said first counter reaches a predetermined value, the output of said frequency divider circuit being connected to said first counter to reset the same with said output signal, a second counter connected to said logic circuit means to be rendered operable thereby and connected to said frequency divider circuit to be advanced by the output signal therefrom, comparing means connected to said second document detector to be rendered operable during the period a signal is generated by said second document detector and connected to said first and second counters to generate an output signal upon the values in said counters being equal, the output of said comparing means being connected to said first counter to reset the same to enable successive comparisons to be made between said first and second counters.

4. The document reading machine of claim 3, wherein said first and second document detectors comprise a light source and a light sensitive device.

5. In a document reading machine, the combination comprising:

an oscillator, a first counter connected to said oscillator to be advanced thereby, means for measuring the velocity of a document prior to the same entering the read station of said document reading machine, a frequency divider circuit connected to said document velocity measuring means to be rendered operable thereby and connected to said first counter to provide an output signal every time said first counter reaches a predetermined value, the output of said frequency divider circuit being connected to said first counter to reset the same, a second counter connected to said document velocity measuring means to be rendered operable thereby and connected to said frequency divider circuit to be advanced by the output signal therefrom during the period that it is rendered operable by said document velocity measuring means, selectively operable comparing means connected to said first and second counters to generate an output signal upon the values in said counters being equal, the output of said comparing means being connected to said first counter to reset the same to enable successive comparisons, and means for selectively rendering said comparing means operable.

6. The document reading machine of claim 5 wherein said means for selectively rendering said comparing means operable is operable during the period that a document is being read.

7. In a document reading machine, the combination comprising:

generating means for generating impulses, means for measuring the velocity of a document, storage means connected to said generating means for storing impulses as a reference value during the period of time for measuring the velocity of a documet, and means operable after the measurement of the velocity of a document connected to said generating means and said storage means for generating an impulse whenever the impulses from said generating means equals the reference value in said storage means.

8. In a document reading machine the combination comprising:

means for measuring the velocity of a document prior to the same entering the read station of said document reading machine, an oscillator, first means for registering the number of output impulses from said oscillator during the period of time said velocity measuring means is measuring the velocity of a document, second means for registering the number of output impulses from said oscillator after the velocity of a document has been measured.

means for comparing the contents of said first and second means after the velocity of a document has been measured and operable to generate an impulse upon the comparison being equal.

9. The document reading machine of claim 8 further comprising means for resetting said second means after each equal comparison to enable successive comparisons.

10. In a document reading machine, the combination comprising a variable frequency pulse generator for generating a series of pulses, means for measuring the velocity of a document prior to the same entering the read station of said document reading machine, and means responsive to said velocity measuring means for varying the frequency of said pulse generator.

References Cited by the Examiner

UNITED STATES PATENTS

| | | | |
|---|---|---|---|
| 2,616,965 | 11/1952 | Hoeppner | 178—43.5 |
| 2,835,868 | 5/1958 | Lindesmith | 324—111 |
| 3,126,475 | 3/1964 | Coddington et al. | 235—92 |

MAYNARD R. WILBUR, *Primary Examiner.*

D. W. COOK, *Examiner.*

R. COUNCIL, *Assistant Examiner.*